United States Patent [19]
Heydenreich et al.

[11] 4,293,662

[45] Oct. 6, 1981

[54] POLYAMIDES CONTAINING OXIDIZED POLYETHYLENE

[75] Inventors: Frieder Heydenreich, Ratingen; Helmut Korber, Odenthal; Peter Tacke, Krefeld; Friedrich Fahnler, Krefeld; Dieter Neuray, Krefeld, all of Fed. Rep. of Germany

[73] Assignee: Bayer Aktiengesellschaft, Fed. Rep. of Germany

[21] Appl. No.: 99,844

[22] Filed: Dec. 3, 1979

Related U.S. Application Data

[63] Continuation-in-part of Ser. No. 971,386, Dec. 20, 1978, abandoned.

[30] Foreign Application Priority Data

Feb. 13, 1978 [DE] Fed. Rep. of Germany ....... 2805892

[51] Int. Cl.$^3$ .............................................. C08L 77/00
[52] U.S. Cl. .................................... 525/184; 525/183
[58] Field of Search ...................... 260/857 L; 525/184

[56] References Cited

U.S. PATENT DOCUMENTS

| | | | |
|---|---|---|---|
| 3,262,989 | 7/1966 | Brignac | 260/857 L |
| 3,373,222 | 3/1968 | Armstrong | 260/857 L |
| 3,484,403 | 12/1969 | Brunson | 260/857 L |
| 3,822,227 | 7/1974 | Hermann | 260/857 L |

Primary Examiner—Paul Lieberman
Attorney, Agent, or Firm—Connolly and Hutz

[57] ABSTRACT

High impact resistant polymer blends comprising 70-99% by weight of a polyamide and 1-30% by weight of a polyethylene having been oxidized by a special process.

6 Claims, No Drawings

POLYAMIDES CONTAINING OXIDIZED POLYETHYLENE

This is a continuation in part application of my patent application Ser. No. 971,386, filed Dec. 20, 1978, now abandoned.

This invention relates to polyaminde moulding compositions having an increased impact strength which optionally contain further additives, such as fillers and reinforcing materials.

By virtue of their mechanical strength values, their ready processibility and other advantageous properties, mouldings of polyamides are used for a wide variety of applications. Thus, housing shells, rollers, gear wheels, toggle levers and a whole number of technical articles are moulded from polyamides. Among the advantageous properties of partially crystalline polyamide moulding compositions, their hardness, abrasion resistance and self-lubrication are particularly important, for example for the production of gear wheels. However, polyamide moulding compositions have certain disadvantages in comparison with other moulding compositions for applications wherein particularly thoughness is required. In order to eliminiate this deficiency, it is standard practice to condition polyamide mouldings by adding approximately 3% of water to them. The water considerably increases thoughness. However, disadvantages of this process are the prolonged water-uptake period and the fact that an additional processing step is necessary. Another disadvantage lies in the inhomogeneous distribution of the water in the moulding.

Accordingly, an object of the present invention is to increase the thoughness of polyamide moulding compositions easily. According to the invention, this object is achieved by incorporating into polyamide moulding compositions polyethylenes which have been oxidised by a certain process.

Attempts have already been made to improve the toughness of crystalline polyamide moulding compositions by the addition of polyolefins. Accordingly, polyamide 6 for example has been mixed with polyethylenes of different molecular weight in a twin-screw extruder. In this process it is important to mix under the action of shear forces of at least 250 s$^{-1}$.

Moulding compositions produced in this way and the mouldings produced from them also show inhomogeneities, streaks, surface faults and unsatisfactory properties. Under flexural stress and particularly under alternating flexural stress, the mouldings show a tendency towards scaling (also known as white fracture) in consequence of the incompatability between the two components.

In a modification of this process, the compatibility of the polar polyamide with the apolar polyethylene is improved by the addition of peroxides or other radical formers. Accordingly, the polyamide and polyethylene macromolecules are chemically bounded in order to improve the homogeneity. However, the notched impact strength of products obtained in this way is poorer than that of the pure polyolefin or polyamide.

According to the present invention, the disadvantages of the known processes are avoided by homogeneously mixing polyamides with specially oxidised polyethylenes.

Accordingly, the present invention provides high-impact resistant polymer blends comprising (1) 70 to 99% by weight and preferably 80 to 99% by weight, based on the mixture as a whole, of polyamides and (2) 1 to 30% by weight and preferably 1 to 20% by weight, based on the mixture as a whole, of oxidised polyethylenes, which are characterised in that the oxidised polyethylenes used are obtained by oxidising polyethylene in the melt with oxygen or oxygen-containing gases, under intensive mixing and kneading under a pressure of from 1 to 150 bars, at a temperature of from 100° to 300° C. and over a reaction time of at most 20 minutes.

The oxidised polyethylenes are preferably obtained by the process described in German Patent Application No. P 27 58 785.5.

This process essentially comprises introducing the hydroperoxide groups very rapidly into the polyethylene under moderate reaction conditions. Accordingly, the polymer merely has to be briefly exposed to relatively high pressures and temperatures, accompanied by thorough admixture with oxygen or oxygen-containing gases. Degradation of the material by shortening of the chains and a reduction in molecular weight is largely avoided. There is no need for a catalyst to be added because the process is thermally initiated.

The quantity of hydroperoxide groups introduced in this way corresponds to between about 1000 and 10,000 ppm of active oxygen. The hydroperoxide groups are uniformly distributed throughout the polyethylene. Under more rigorous conditions, it is possible to introduce carboxyl, ester and keto groups in addition to the hydroperoxide groups with slight degradation of the polyethylenes. The quantity of groups introduced in this way amounts to from 0 to 5% and preferably from 0 to 1% of acid groups and to from 0 to 10% and preferably from 0 to 2% of ester groups. The oxidised polyethylene has preferably a molecular weight $M_n$ of from 15000 to 25000.

In general, the process for producing the oxidised polymers is carried out by melting and compressing the polyethylene in an extruder. After the compression zone, oxygen or an oxygen-containing gas is introduced in excess into the induction zone under a pressure of from 1 to 150 bars and at a temperature of from 100° to 300° C. The oxidation process is started in the induction zone and completed at 100° to 300° C. in the following oxidation zone where oxygen or an oxygen-containing gas is introduced in excess into the extruder under a pressure of from 1 to 150 bars. The oxidation zone is followed by a compression zone for retaining pressure and then by a venting zone in which the gases escape. The reaction product is then extruded and granulated.

The oxidised polyethylenes may be derived from high-pressure and low-pressure polyethylenes. It is preferred to use polyethylenes having a melt index MI under condition E of from 2 to 100 g/10 mins.

The polyamides used may be aliphatic or aromatic polyamides, preferably those characterised by a lower relative viscosity limit of $\eta_{rel}=2.3$ (as measured on a 1% polyamide solution in m-cresol at 25° C.).

It is particularly preferred to mix aliphatic polyamides and, of these, polyamide-6 and polyamide-6,6 with the oxidised polyethylenes.

The oxidied polyethylenes may be incorporated into the polyamide either in extruders or by addition to the polyamide monomers before polymerising them batchwise in an autoclave or continuously in an autoclave cascade or VK-tube. When mixing is carried out in an extruder, it is preferred to use a twin screw extruder. Mixing is generally carried out at temperatures in the range of from 230° to 320° C. The polyamide moulding compositions modified in accordance with the invention are distinguished not only by their excellent homogeneity, but also by a greatly increased notched impact strength in comparison to unmodified polyamides.

The polyamide moulding compositions according to the invention may also contain standard additives such as, for example, nucleating agents, dyes, pigments, stabilisers, optical lighteners, mould release agents, plasticisers and lubricants in known amounts. In addition, they may contain fillers and reinforcing materials such as, for example, chalk, kaolin, talcum, quartz powder, mica or feldspar and glass and asbestos fibres, in quantities of from 0 to 60% by weight, preferably 1–50% by weight, based on the whole mixture.

The polyamide moulding compositions according to the invention have outstanding processing properties such as, for example, good flow properties and good mould-release properties and may be processed by standard processes, such as injection moulding, extrusion, melt spinning or deep drawing, to form satisfactory homogeneous shaped articles, such as filaments, fibres, bristles, domestic articles, machine components and technical semifinished articles.

EXAMPLE 1

(a) High pressure polyethylene containing hydroperoxide groups was produced in a contra-rotating laboratory twin screw extruder of the Point Eight Type manufactured by Messrs. Welding Inc. with a screw diameter D of 20 mm and a screw length of 48 D. Compression of the melt was obtained by enlarging the core diameter of the screws in the compression zones. The throughput amounted to 2000 g per hour with the screws rotating at 200 rpm. The average residence time of the product in the extruder was 3 minutes. The screws had a constant pitch of 1 D.

120 liters/hour of air were introduced into the induction zone under a pressure of 80 bars, whilst 240 liters/hour of air were introduced into the oxidation zone under a pressure of 60 bars.

The extruded polyethylene contained 2800 ppm of hydroperoxide groups (determined as active oxygen) and had an acid number of 4. Its melt index under condition E at 190° C. amounted to 58 g/10 mins.

The lengths and temperatures of the various zones of the extruder are shown in Table 1.

The starting material used was a standard commercial-grade high-pressure polyethylene (Baylon ® 19 N 430, a product of Bayer AG).

TABLE 1

| Zone | Example 1 | |
|---|---|---|
| | Length | Temperature °C. |
| Feed | 2 D | 110° |
| Melting | 5 D | 180° |
| Compression | 2 D | 180° |
| Induction | 3 D | 233° |
| Oxidation | 22 D | 210° |
| Compression | 2 D | 210° |
| Venting | 7 D | 180° |
| Ejection | 5 D | 170° |
| | 48 D | |

The starting polyamide used is a polycaprolactam having the following characteristics:

| | |
|---|---|
| $\eta_{rel}$ | 3.08 |
| extract content: | 0.4% by weight |
| water content: | <0.15% by weight |

The relative viscosity was measured on a solution of 1 g of polyamide in 100 ml of m-cresol at a temperature of 25° C.

(b) 12% by weight of the oxidised polyethylene produced in accordance with Example (1a) were incorporated into the polyamide in a ZSK 83 twin-screw extruder which was also equipped with kneading blocks. The incorporation temperature was 290° C. The product was spun off into strands, cooled to approximately 70° C., chopped into a 3×2 mm granulate and dried to a water content of <0.15%.

The granulate had a relative viscosity $\eta_{rel}$ of 2.9, determined as disclosed above and an extract content of 1.0%. The granulate was injection moulded in a screw injection moulding machine to form standard small test bars on which the notched impact strength was measured in accordance with DIN 53 453. The notched impact strength of the test specimens produced from the polyamide moulding composition according to the invention amounted to 14.8 kJ/m². By contrast, the notched impact strength of the test specimen produced from the unmodified polyamide moulding composition only amounted to 3 kJ/m².

EXAMPLE 2

(a) An oxidised polyethylene having the following characteristics is produced in accordance with Example (1a):

| | |
|---|---|
| MI$_{190° C.}$: | 10 |
| hydroperoxide content: | 900 ppm |
| acid number: | 1 |

The throughput amounted to 8000 g per hour with the screws rotating at 500 rpm. The average residence time of the products in the extruder was 0.8 minute.

90 liters/hour of air were introduced into the induction zone under a pressure of 110 bars whilst 150 liters/hour of air were introduced into the oxidation zone under a pressure of 80 bars.

The lengths and temperatures of the various zones of the extruder are shown in Table 2.

TABLE 2

| Zone | Example 2 | |
|---|---|---|
| | Length | Temperature °C. |
| Feed | 2 D | 125° |
| Melting | 5 D | 180° |
| Compression | 2 D | 200° |
| Induction | 3 D | 232° |
| Oxidation | 22 D | 220° |
| Compression | 2 D | 210° |
| Venting | 7 D | 200° |
| Ejection | 5 D | 200° |
| | 48 D | |

(b) 12% by weight of the oxidised polyethylene produced in accordance with Example (2a) were incorporated into a polyamide according to Example 1 in the same way as described in Example (1b).

A granulate having the following characteristics was obtained:

| $\eta_{rel}$(m-cresol): | 2.90 |
| extract content: | 0.90% |
| water content: | <0.15% H$_2$O |

The granulate was injection moulded in the same way as in Example (1b) to form standard small test bars on which a notched impact strength of 15.1 kJ/m$^2$ was measured in accordance with DIN 53 453.

We claim:

1. A high-impact resistant polyamide moulding composition consisting of a mixture of
    (1) 70 to 99% by weight, based on the mixture as a whole, of at least one polyamide and
    (2) 1 to 30% by weight, based on the mixture as a whole, of oxidized polyethylene, the oxidised polyethylene having a number average molecular weight of from 15,000 to 25,000 and having been obtained by oxidising polyethylene in the melt with oxygen or an oxygen-containing gas, under intensive mixing and kneading under a pressure of from 1 to 150 bars, at a temperature in the range of from 100° to 300° C. and over a reaction time of at most 20 minutes.

2. A moulding composition as claimed in claim 1, consisting of a mixture of 80 to 99% by weight of component (1) and 1 to 20% by weight of component (2).

3. A moulding composition as claimed in claim 1, wherein the oxidised polyethylene contains from 1,000 to 10,000 ppm of active oxygen.

4. A moulding composition as claimed in claim 1, wherein the polyamide has a relative viscosity of at least 2.3 (measured as a 1% polyamide solution in m-cresol at 25° C.

5. A moulding composition as claimed in claim 1, wherein as polyamide component polyamide-6 or polyamide-6,6 is used.

6. Mouldings prepared from a moulding composition as claimed in claim 1.

* * * * *